United States Patent
Gilligan et al.

(10) Patent No.: US 6,773,132 B2
(45) Date of Patent: Aug. 10, 2004

(54) EMERGENCY KIT HAVING AN AIR COMPRESSOR IN COMBINATION WITH AN IMPACT WRENCH AND A TIRE JACK FOR CHANGING A TIRE

(76) Inventors: James Gilligan, 1810 Crescent Pkwy., Linden, NJ (US) 07036; Denim Dycsok, 912 Madison Ave., Elizabeth, NJ (US) 07201

(*) Notice: Subject to any disclaimer, the term of this patent is extended or adjusted under 35 U.S.C. 154(b) by 19 days.

(21) Appl. No.: 10/334,516

(22) Filed: Dec. 31, 2002

(65) Prior Publication Data

US 2004/0125609 A1 Jul. 1, 2004

(51) Int. Cl.⁷ .............................................. F04B 35/04
(52) U.S. Cl. ....................... 362/119; 362/96; 362/156; 152/416
(58) Field of Search ............................ 362/96, 109, 119, 362/353, 154, 155, 156, 253; 152/416, 418; 417/234

(56) References Cited

U.S. PATENT DOCUMENTS 4,830,579 A * 5/1989 Cheng ......................... 417/234
5,051,068 A * 9/1991 Wong ......................... 417/234

* cited by examiner

*Primary Examiner*—Stephen Husar
*Assistant Examiner*—Hargobind S. Sawhney (57) ABSTRACT

A kit for changing a tire having a portable carrying case with a first compartment and a second compartment which are movable between an open position and a closed position. The first compartment is used for housing an air compressor motor and a tank for holding compressed air and the second compartment includes a plurality of preformed depressions for containing an impact wrench, a tire jack and a plurality of hoses therein. The compressed air holding tank includes a plurality of air connector ports for attaching the hoses to the air connector ports and to the impact wrench and to the tire jack. The tire changing kit also includes an electrical cord having an electrical quick connect plug at one end and a cigarette lighter inlet plug at the other end, the cigarette lighter inlet plug is received within and powered by a cigarette lighter receptacle of a vehicle for supplying electrical power to the air compressor motor for generating compressed air in order to pneumatically power the impact wrench and the tire jack.

24 Claims, 5 Drawing Sheets

EMERGENCY KIT HAVING AN AIR COMPRESSOR IN COMBINATION WITH AN IMPACT WRENCH AND A TIRE JACK FOR CHANGING A TIRE

FIELD OF THE INVENTION

The present invention relates to an emergency kit for changing a flat tire on a vehicle. More particularly, this invention relates to a portable kit having an air compressor assembly in combination with an impact wrench and a car tire jack for changing a flat tire on a vehicle.

BACKGROUND OF THE INVENTION

Vehicles such as automobiles, pick-up trucks, SUV's, vans and the like are usually equipped with a manual spider wrench and a manually operated car scissors jack or similar carjacks for the removal of a flat tire. Frequently, the portable carjacks and lug nut removal tools may be lost and/or not available for service. On occasions, the jack and lug wrench may be stored in the trunk under luggage or other trunk supplies and other miscellaneous paraphernalia, requiring the trunk to be unloaded to get to these tools. Further, many times after the flat tire has been changed, the replacement tire is either low on air or also flat.

Additionally, another problem occurs, even though the carjack and lug wrench are operated to lift the vehicle and remove the lugs from the tire without too much effort by the operator, but it still takes considerable physical effort by women or the elderly in order to lift the vehicle and to remove the lug nuts from the flat tire and to re-tighten the same after the flat tire has been changed.

There remains a need for a self-contained kit for changing a flat tire having all portable components that include a lightweight air compressor motor and a compressed air holding tank, wherein the air compressor assembly is powered via the cigarette lighter inlet receptacle of a vehicle. Further, there is a need for an air compressor assembly in combination with a compact, portable tire jack being moved by the air compressor motor for lifting and lowering of the vehicle in order to replace the flat tire on a vehicle, as well as for use with a portable impact wrench to remove a plurality of tire lugs on the wheel of the tire needing to be changed. The air compressor assembly, impact wrench and tire jack would all be contained within a lightweight (self-contained) carrying case for facilitating the changing of the flat tire with ease, speed and safety.

DESCRIPTION OF THE PRIOR ART

Tire changing assemblies, tire changing systems and portable tools for tire changing are of various designs, configurations, structures and materials of construction have been generally disclosed in the prior art. For example, U.S. Pat. No. 4,872,230 to Levine discloses an electrically powered automobile jack and nut remover. The tire jack is powered through a cigarette lighter type plug by the automobile battery, and has an outlet for receipt and for powering of a tire nut remover or other equipment. In another embodiment, the nut remover is powered by the automobile battery, drives the tire jack in an upward or downward movement. This prior art patent does not disclose or teach the concept of the present invention of a tire changing kit having all portable components being an air compressor, an impact wrench and a tire jack, all contained within the kit.

U.S. Pat. No. 5,722,641 to Martin, et al. discloses a vehicle mounted tire changing system having a hydraulic jack system connected to a vehicle for lifting a portion of the vehicle relative to the supporting terrain and a pneumatic system carried by the vehicle for connecting air operated tools. The hydraulic jack system includes an air compressor for hydraulically powering and activating the hydraulic jacks to raise and/or lower the vehicle. This prior art patent does not disclose or teach the concept of the present invention of a tire changing kit having all portable components being an air compressor, an impact wrench and a tire jack, all contained within the kit.

U.S. Pat. No. 5,876,526 to Ham ade, et al. discloses an automotive flat tire repair system. The repair system includes an air compressor system mounted to the underside of a vehicle. The repair system also includes a portable pneumatic power impact wrench and a portable scissors jack for replacing and repairing the flat tire. This prior art patent does not disclose or teach the concept of the present invention of a tire changing kit having all portable components being an air compressor, an impact wrench and a tire jack, all contained within the kit.

U.S. Pat. No. 6,237,953B1 to Farmer discloses an automatic jack and wheel change system. The wheel change system includes at least one inverted jack driven by an electric motor permanently attached to the vehicle. The system may employ a jack disposed between the front and rear wheel on each side of the vehicle, or it may be equipped with a jack at each of the four wheels. This prior art patent does not disclose or teach the concept of the present invention of a tire changing kit having all portable components being an air compressor, an impact wrench and a tire jack, all contained within the kit.

None of the aforementioned prior art patents disclose a self-contained, lightweight kit having all of the necessary components in portable form for changing a flat tire that include an air compressor assembly, an impact wrench and a tire jack, all contained within a lightweight carrying case to be stored in every vehicle in case of an emergency.

Accordingly, it is an object of the present invention to provide a tire changing kit having all portable components that include an air compressor assembly having an air compressor motor and a compressed air holding tank, an impact wrench and a tire jack, all contained within a heavy duty and compact carrying case for storage in the trunk of a vehicle.

Another object of the present invention is to provide a tire changing kit having an air compressor assembly that is lightweight, with an air inflation capacity of at least 1.0 cubic foot per minute having a power rating of at least ¼HP at a pressure rating between 100 psig to 250 psig, wherein the air compressor motor can be powered via a cigarette lighter inlet plug of a vehicle.

Another object of the present invention is to provide a tire changing kit having a lightweight, durable, pneumatic impact wrench for removing the tire lugs or nuts from the wheel rim of the flat tire and for re-tightening the tire lugs after the flat tire has been changed by a replacement tire.

Another object of the present invention is to provide a tire changing kit having a lightweight, metal, durable, pneumatic carjack for lifting and lowering of a vehicle in order to remove and replace the flat tire of the vehicle.

Another object of the present invention is to provide a tire changing kit that includes a heavy duty, durable and lightweight carrying case for holding therein all of the component tools.

Another object of the present invention is to provide a tire changing kit that has the air compressor assembly built into one of the halves of the carrying case.

Another object of the present invention is to provide a tire changing kit that also includes an air injection nozzle and hose for injecting air into a flat tire or a tire needing air which may be connected to the air compressor motor.

Another object of the present invention is to provide a tire changing kit that includes a carrying case having a pressure gauge, a power transformer and a cigarette lighter inlet plug for powering the air compressor motor via a cigarette lighter of the vehicle being detachably connected to the case sections of the carrying case.

Another object of the present invention is to provide a tire changing kit that facilitates the changing of a flat tire with ease, speed and safety for use especially by women and the elderly (having no manually operated components).

Another object of the present invention is to provide a tire changing kit that is self-contained, lightweight and compact to be easily carried by hand, and which is compact for storage within a trunk area of an automobile and the like.

A further object of the present invention is to provide a tire changing kit that can be mass produced in an automated and economical manner and is readily affordable by the consumer.

SUMMARY OF THE INVENTION

In accordance with the present invention, there is provided an emergency kit for changing a tire. The tire changing kit includes a portable carrying case having a first compartment and a second compartment which are movable between an open position and a closed position. The first compartment is for housing an air compressor motor and a tank for holding compressed air and the second compartment includes a plurality of preformed depressions for containing an impact wrench, a tire jack and a plurality of hoses therein. The compressed air holding tank includes a plurality of air connector ports for attaching the hoses to the air connector ports and to the impact wrench and to the tire jack. The tire changing kit also includes an electrical cord having an electrical quick connect plug at one end and a cigarette lighter inlet plug at the other end so that the cigarette lighter inlet plug is received within and powered by a cigarette lighter receptacle of a vehicle for supplying electrical power to the air compressor motor for generating compressed air in order to pneumatically power the impact wrench and the tire jack.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 1:
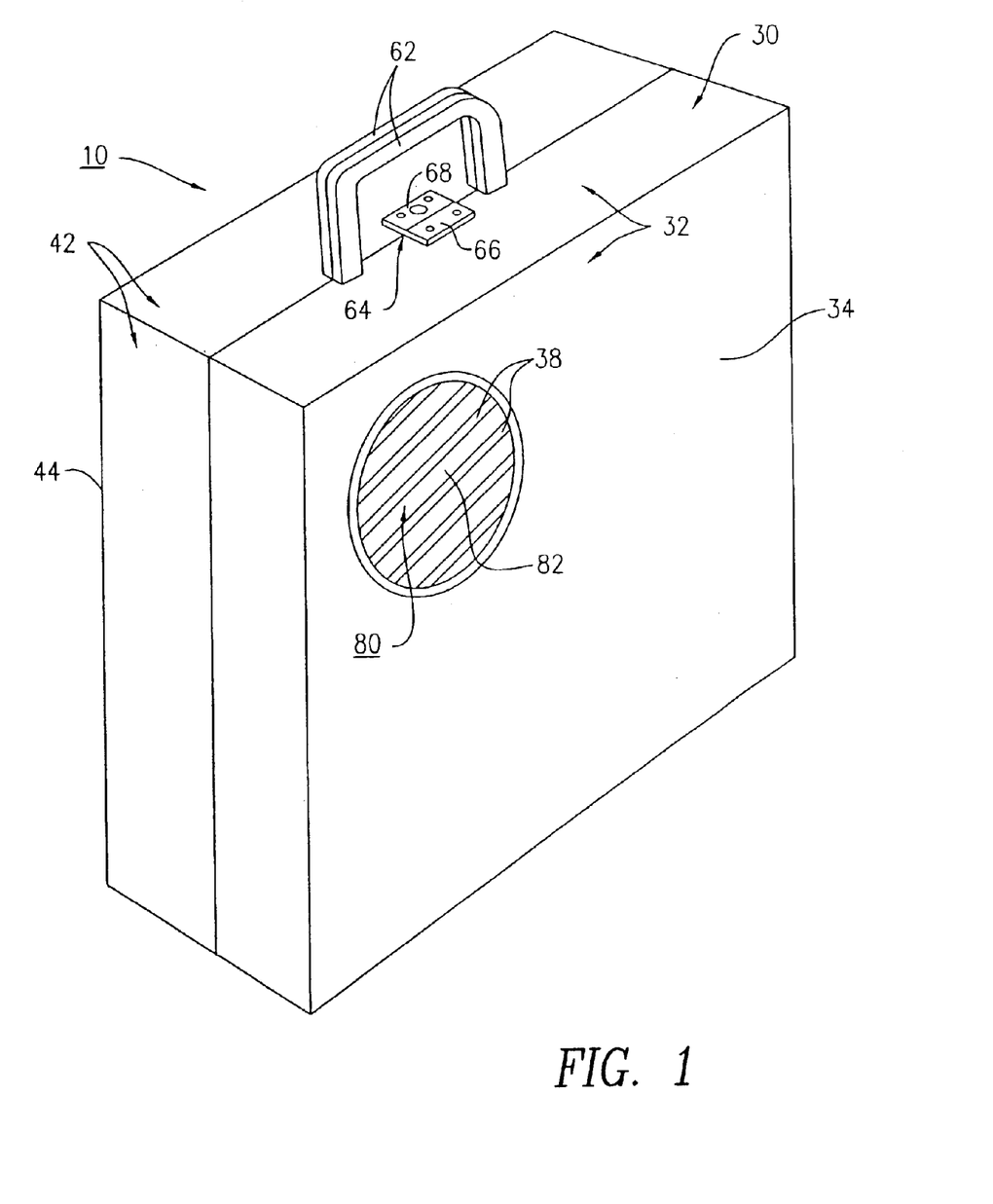
FIG. 1 is a front perspective view of the tire changing kit of the preferred embodiment of the present invention showing the carrying case in a closed configuration containing the component tools and air compressor therein.
Figure 2:
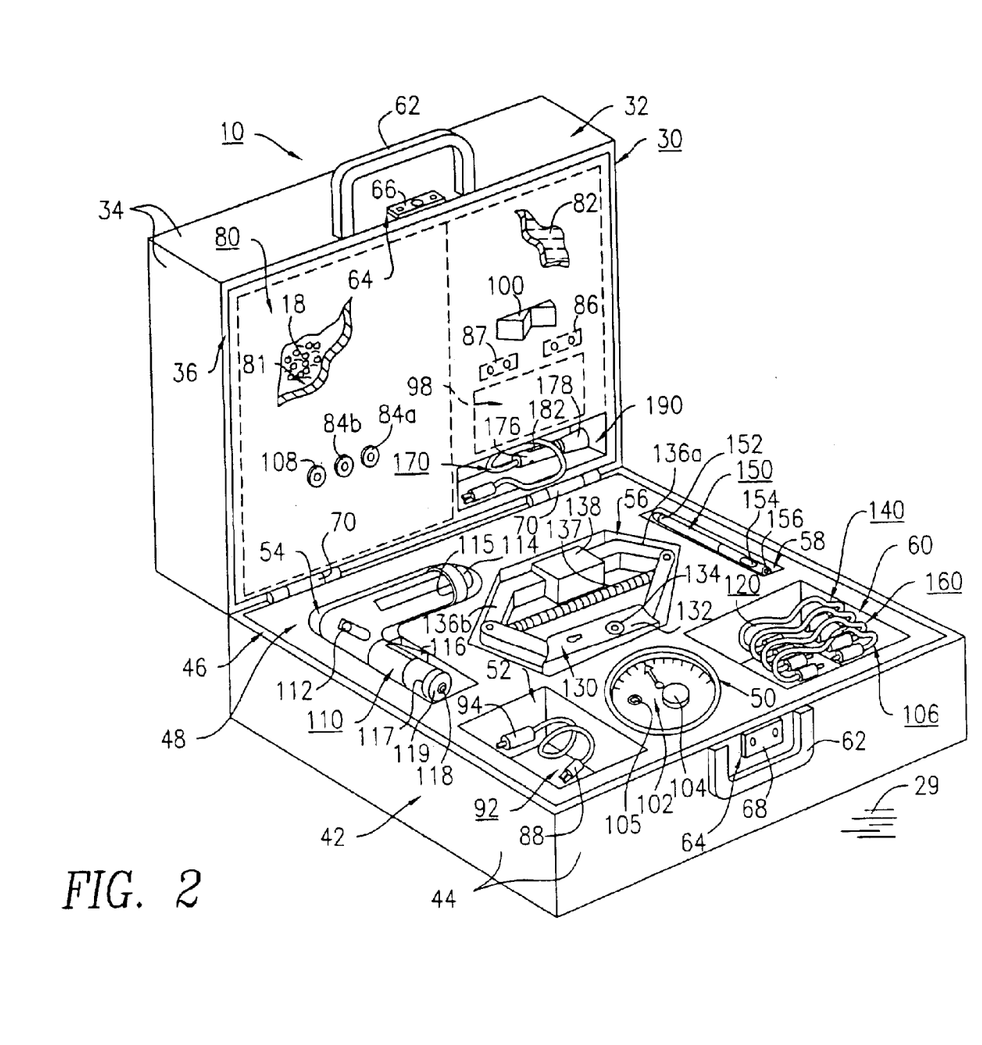
FIG. 2 is a front perspective view of the tire changing kit of the present invention showing all of the component tools, hosing, air compressor, pressure gauge, electrical cord and plug within a plurality of cut-out compartments for holding the aforementioned component parts therein.
Figure 3:
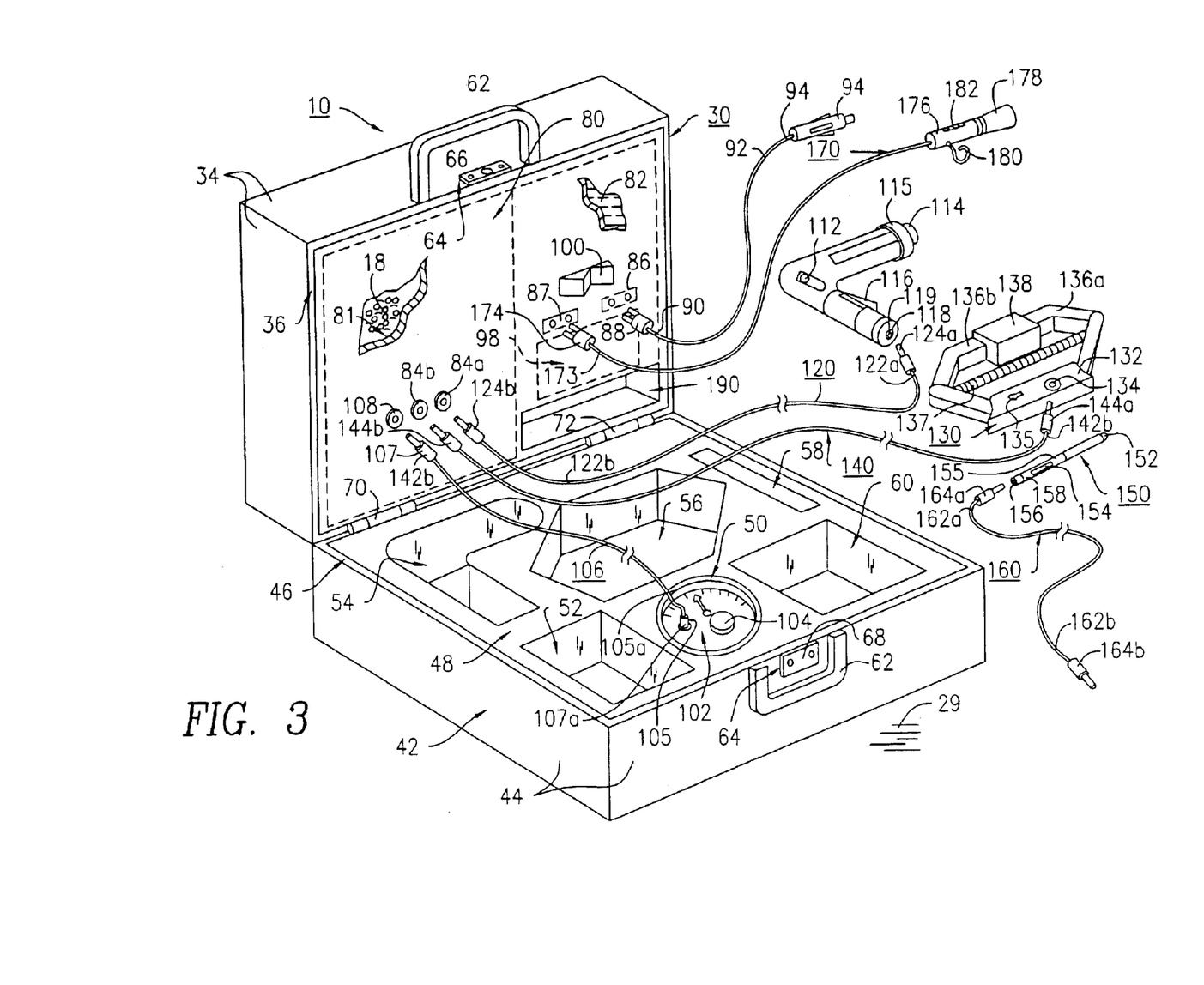
FIG. 3 is an exploded front perspective view of the tire changing kit of the present invention showing the carrying case and all of the major component parts thereof.
Figure 4:
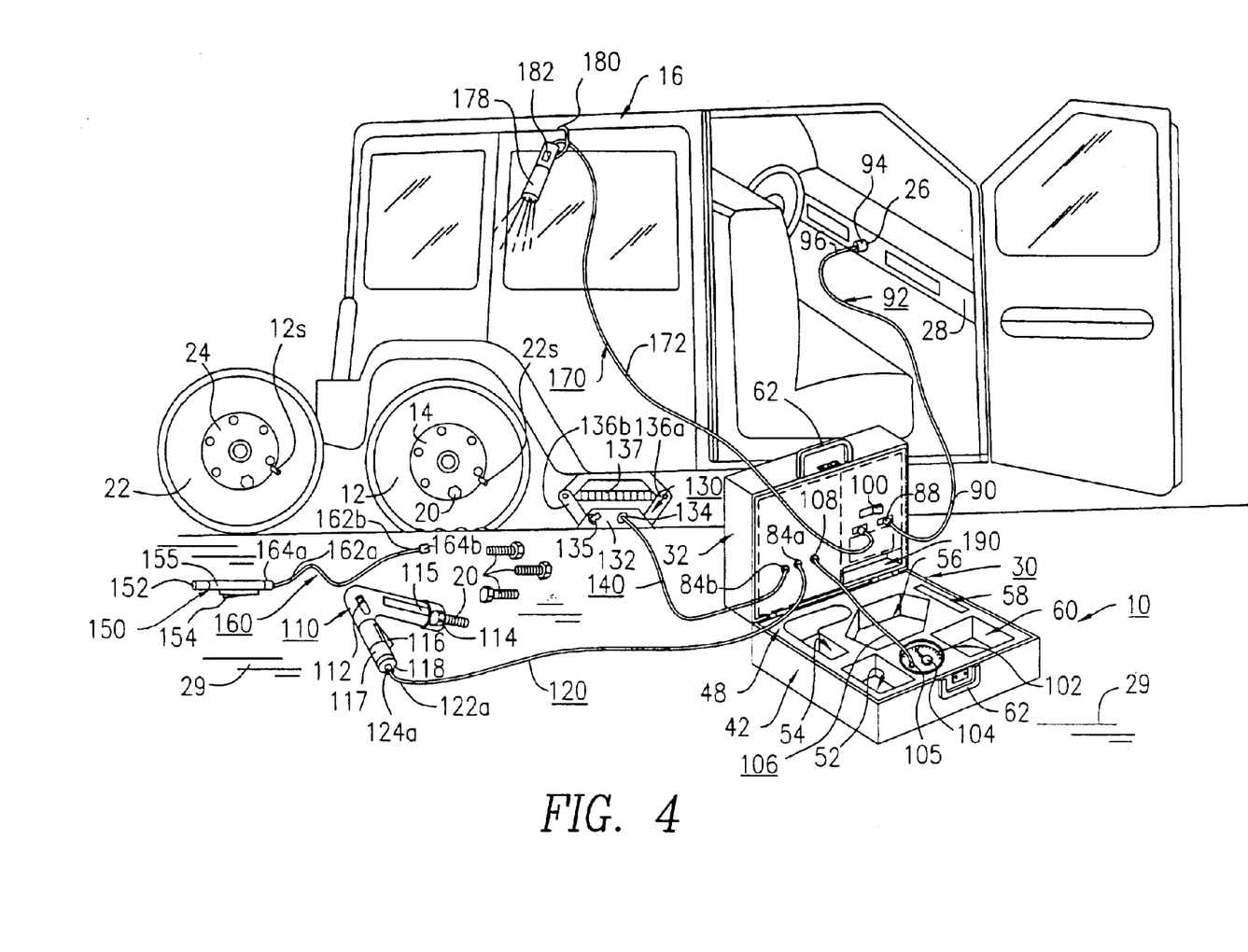
FIG. 4 is a perspective view of the tire changing kit of the present invention showing the kit in operational use with air compressor and its electrical cord and plug connected to the cigarette lighter of a car and the pneumatic impact wrench removing a tire lug from a wheel.
Figure 5:
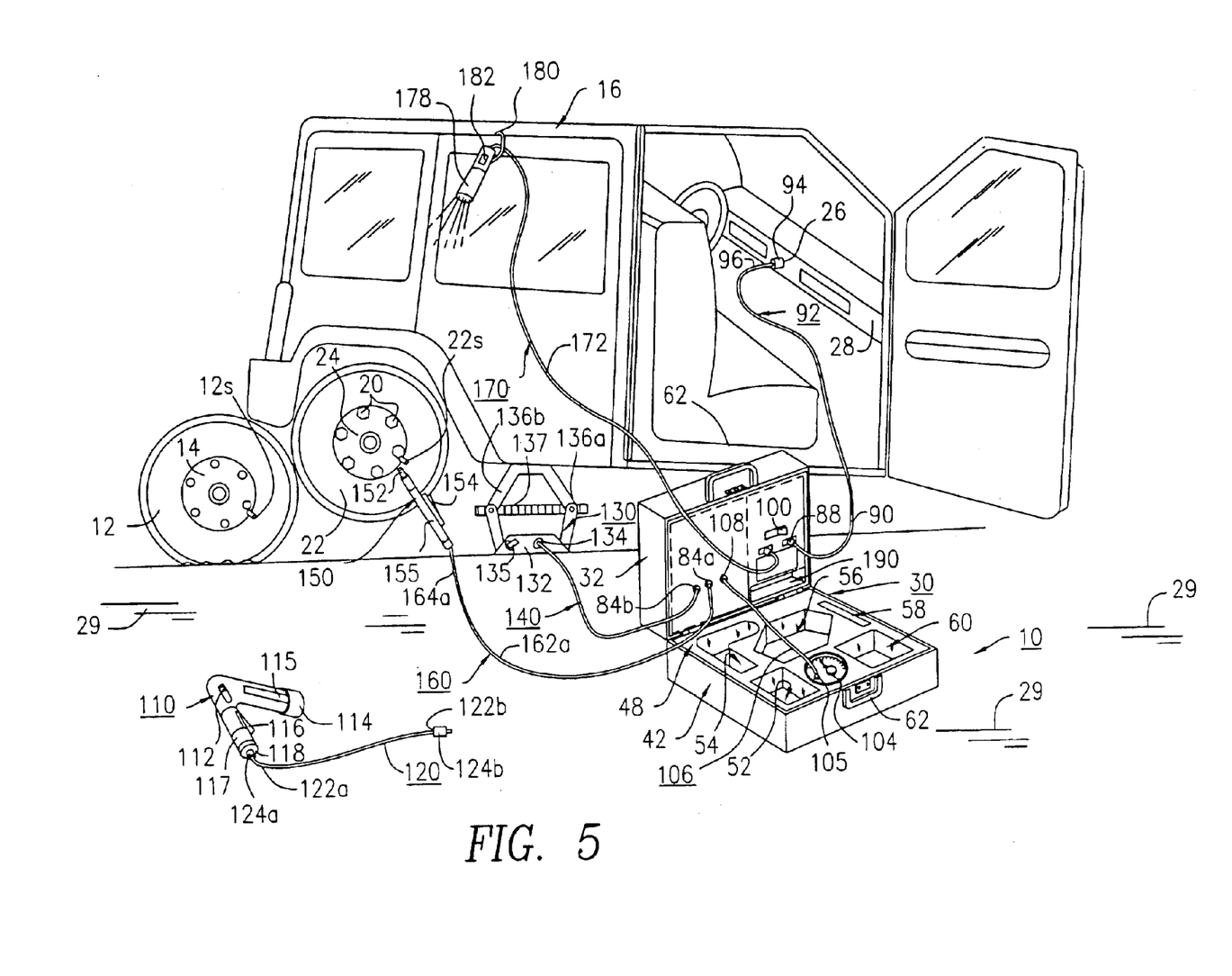
FIG. 5 is a perspective view of the tire changing kit of the present invention showing the kit in operational use with the pneumatic scissors jack lifting the wheel of the vehicle from the ground, and the replacement tire being filled with air using the air injection nozzle.

The self-contained tire changing kit 10 and its component parts of the preferred embodiment of the present invention are represented in detail by FIGS. 1 through 5 of the patent drawings. The self-contained tire changing kit 10 is used for removing and changing a flat tire 12 on a wheel rim 14 from a vehicle 16, as shown in FIGS. 4 and 5. As shown in FIGS. 1 to 3, the tire changing kit 10 includes a heavy duty but lightweight carrying case 30 having all of the portable components contained therein, including an air compressor assembly 80 for supplying pressurized air 18, a pneumatic impact wrench 110 for removing tire lugs or nuts 20 from the wheel rim 14, a pneumatic scissors-type car tire jack 130 for lifting and lowering the vehicle 16 in order to remove and replace the flat tire 12 and wheel rim 14 with a replacement tire 22 and wheel rim 24 of vehicle 16, and an air injection nozzle 150 for injecting pressurized air 18 into the flat tire 12 or the replacement tire 22 needing air 18.

As shown in FIGS. 1 to 3, the carrying case 30 includes an upper case section 32 and a lower case section 42. The upper case section 32 includes a molded plastic or stamped metal outer wall 34 for forming an interior compartment 36. The outer wall 34 includes a plurality of slotted vent openings 38 for discharging of excess pressurized air 18 from the air compressor assembly 80. The interior compartment 36 receives and holds the air compressor assembly 80 therein.

The lower case section 42 includes a molded plastic or stamped metal outer wall 44 for forming an interior compartment 46. The interior compartment 46 is used for holding and receiving a pre-fitted tool holding member 48 therein. The tool holding member 48 includes a plurality of preformed cutout compartments or depressions 50, 52, 54, 56, 58 and 60 for holding and/or storing the component parts/tools (e.g., the impact wrench 110, the tire jack 130, the air injection nozzle 150 and component tool hosing 120, 140 and 160, etc.). Further, the carrying case 30, as depicted in FIGS. 1 to 3, also includes a two part carrying handle 62, a locking member 64 having a locking latch 66 and locking tab 68, and a pair of spaced-apart hinging members 70 and 72 for opening and closing each of the case sections 32 and 42, respectively, of carrying case 30, as shown in FIGS. 1 to 3 of the drawings. The carrying case 30 may be made from a hard, durable and moldable plastic material; or stamped, lightweight metal materials, such as aluminum or stainless steel. In an alternate configuration, the air compressor assembly 80 may be part of the carrying case 30, such that the outer wall of the holding tank 81 and the air compressor motor 82 is the outer wall 34 of carrying case 30.

The air compressor assembly 80, as shown in FIGS. 2 and 3, includes a pressurized air holding tank/container 81 and an air compressor motor 82. The air holding tank 81 is rectangularly shaped and is made of lightweight metal such as aluminum or stainless steel. The air holding tank includes a pair of quick-connect openings or ports 84a and 84a for pressurized air discharge. The compressor motor 82 includes a quick connect electrical outlet 86 for receiving an electrical quick connect plug 88 located at a proximal end 90 of an electrical cord 92. The electrical cord 92 also includes a detachable cigarette lighter inlet plug 94 located at a distal end 96 of electrical cord 92. The air compressor assembly 80 further includes a power transformer 98 for use with an AC 115V power supply (not shown), and an on/off power switch 100 for supplying power to the air compressor motor 82 of air compressor assembly 80. The cigarette lighter inlet plug 94 can be substituted with a standard electrical plug (not shown) for use with the 115V AC power supply within a home. As shown in FIGS. 2 and 3, the air compressor assembly 80 also includes an air pressure gauge 102 having an adjustable air pressure control knob 104 for controlling the amount of pressurized air 18 the user needs for using the impact wrench 110 and tire jack 130 when changing the flat tire 12. The pressure gauge 102 also includes a connecting air line hose 106 having at each of its ends 105a, 105b includes a quick release connector member 107a and 107b, respectively, thereon for connecting the air pressure gauge 102 to an air outlet opening (port) 108 on the air holding tank 81 of air compressor assembly 80. The air pressure gauge 102 is received within the cutout compartment 50 of the tool holding member 48, as depicted in FIG. 3 of the drawings, for holding and securing the air pressure gauge 102 in place. The electrical cord 92 and its associated plugs 88, 94 are received within the preformed cutout compartment 52 of the tool holding member 48, as depicted in FIGS. 2 and 3, for holding and securing the electrical cord and plugs 88, 94 in place when not in operational use.

The air compressor assembly 80 is lightweight having an air inflation capacity of at least 1.0 cubic feet per minute with a power rating of at least ¼HP and at a pressure rating for operating the pressurized air 18 between 100 psig to 250 psig. The air compressor assembly 80 can be powered via the cigarette lighter inlet plug 94 of vehicle 16, drawing power on the vehicle's battery (not shown), or by an electrical outlet (not shown) using a 115 V AC power source (not shown) at the user's home.

The pneumatic impact wrench 110, as depicted in FIGS. 2 and 3, includes a control switch 112 for clockwise and counterclockwise rotation of a detachable lug remover member 114 located at the distal end tip 115 of the impact wrench 110. The detachable lug remover member 114 may vary in size and configuration depending on the lug nut 20 used with a particular wheel rim 14 of vehicle 16. The impact wrench 110 also includes an activation trigger 116 connected to a handle member 117. The handle member 117 includes a quick connect receptacle inlet 118 located at the proximal end 119 of the impact wrench 110, as depicted in FIG. 3. The impact wrench 110 further includes an impact wrench pneumatic hosing 120. The impact wrench pneumatic hosing 120 at each of its ends 122a and 122b includes a quick release connector member 124a and 124b, respectively, thereon. Quick release connector member 124a connects to the quick connect opening 84a on the air holding tank 81 of air compressor assembly 80 and quick release connector member 124b connects to the quick connector receptacle inlet 118 on the handle member 117 of impact wrench 110, such that when the impact wrench 110 is in operational use the activation trigger 116 on handle member 117 allows the user to activate the lug remover member 114 on the end tip 115 for rotational movement in order to remove or re-tighten the tire lug 20 when changing the flat tire 12 with a replacement tire 22, as shown in FIG. 5. The pneumatic impact wrench 110 is received within the preformed cutout compartment 54 of the tool holding member 48, as depicted in FIGS. 2 and 3, for holding and securing the impact wrench 110 in place when not in operational use.

The pneumatic tire jack 130, as shown in FIGS. 2 and 3, includes a base member 132 having a quick connect receptacle inlet 134 and a release valve 135 thereon. The scissors tire jack 130 also includes a pair of expandable scissors arms 136a and 136b being pneumatically moved by a screw bar 137, and a top left section 138 for contacting and lifting of the vehicle 16 in order to have access by the user for removing of the flat tire 12 on wheel rim 14. The scissors tire jack 130 further includes a tire jack hosing 140. The tire jack hosing 140 at each of its ends 142a and 142b includes a quick release connector member 144a and 144b, respectively, thereon. Quick release connector member 144a connects to the quick connect opening 84a on the air holding tank 81 of air compressor assembly 80 and quick release connector member 144a connects to the quick connect receptacle inlet 134 on base member 132 of the scissors tire jack 130, as shown in FIGS. 3 to 5 of the drawings, such that when the scissors tire jack 130 is in operational use the release valve 135 is in a closed position allowing the activation of the tire jack 130 to move upwardly where the top lift section 138 comes in contact with the vehicle 16 in order to lift the flat tire 12 and wheel rim 14 off the ground 29. When the release valve 135 is in an opened position the lift section 138 moves downwardly such that the replacement tire 22 comes in contact with the ground 29. The pneumatic scissors tire jack 130 is received within the preformed cutout compartment 56 of the tool holding member 48, as depicted in FIGS. 2 and 3, for holding and securing the scissors tire jack 130 in place when not in operational use. It should be understood that jack 130 may be a hydraulic jack, or any other type of jack.

The air injection nozzle 150, as shown in FIGS. 2 and 3, includes an air injection nozzle tip 152 having a trigger or air discharge button 154 located on a center shaft section 155 of the air injection nozzle 150. The air injection nozzle 150 also includes a quick connect receptacle inlet 156 located at a proximal end 158 of the air injection nozzle 150. The air injection nozzle 150 further includes an air injection nozzle hosing 160. The air injection nozzle hosing 160 at each of its ends 162a and 162b includes a quick release connector member 164a and 164b, respectively, thereon. Quick release connector member 164a connects to one of the quick connect openings 84a or 84a on the air holding tank 81 of air compressor assembly 80 and quick release connector member 164a connects to the quick connect receptacle inlet 156 of the air injection nozzle 150, as shown in FIGS. 3 to 5 of the drawings, such that when the air injection nozzle 150 is in operational use the user simply presses or squeezes the air discharge button or trigger 154 which allows pressurized air 18 to be discharged at the nozzle tip 152 into a tire stem 12s, 22s of the flat tire 12 or replacement tire 22 in order to inflate the tires 12, 22 with pressurized air 18. The air injection nozzle 150 is received within the preformed cutout compartment 58 of the tool holding member 48, as depicted in FIGS. 2 and 3, for holding and securing the air injection nozzle 150 in place when not in operational use. Also, when the aforementioned hosing members 120,140 and 160 are not in operational use, they are received within the preformed cutout compartment 60 of the tool holding member 48, as depicted in FIG. 2, for holding and securing the plurality of hosing members 120, 140 and 160 in place.

The tire changing kit 10, as shown in FIGS. 2 and 3, can optionally include a detachable light source 170 for illuminating the surrounding vehicle area in order to allow the user an illuminated area in which to change the flat tire 12 of vehicle 16. The detachable light source 170 includes an extended electrical cord 172 having at its proximal end 173 an adapter plug 174 for connecting to an electrical plug inlet 87 on the air compressor motor 82 and at its distal end 175 a light bulb socket 176 having a light bulb 178 therein. The light bulb socket 176 includes a hanging hook 180 thereon for attaching the light source 170 to the vehicle 16 for illuminating a particular area and an on/off light switch 182 for turning on light bulb 178. Light bulb 178 can be a standard light bulb, a fluorescent light bulb or a high intensity light bulb. The detachable light source 170 is received within a preformed cutout compartment/depression 190 located within the lower case section 42 of carrying case 30.

OPERATION OF THE PRESENT INVENTION

In operation, the tire changing kit 10 operates in the following manner, as shown in FIGS. 2 to 5 of the drawings. When a flat tire 12 on a vehicle 16 occurs, the user simply removes the carrying case 30 from the trunk of vehicle 16 and opens the carrying case 30 to expose the contents of kit 10 within each of the upper and lower case sections 32 and 42, respectively, as depicted in FIG. 2. As shown in FIG. 3, the user now removes the electrical cord 92 from the cutout compartment 52 and places the electrical quick connect plug 82 within the quick connect electrical outlet 86 on the air compressor motor 82. The user then places the cigarette lighter inlet plug 94 within the cigarette lighter receptacle 26 on the dashboard 28 of vehicle 16. The user then switches to the "on" position power switch 100 for supplying power to air compressor motor 82 for producing compressed (pressurized) air 18 within holding tank 81.

The user now proceeds to remove the connecting air line hose 106 from within compartment 60 and connects the air line hose 106 to the air outlet opening 108 on the air holding tank 81 and to the air inlet opening 105 on air pressure gauge 102. The user then adjusts the air pressure control knob 104 on air pressure gauge 102 to a pressure setting between 100 psig to 250 psig. Next, the user removes the light source extension cord 172 of light source 170 from compartment 190 and then attaches the hook 180 to the vehicle 16 for illuminating a particular area adjacent to the flat tire 12 on vehicle 16. The light switch 182 is then turned to the "on" position for lighting the light bulb 178 to illuminate the flat tire 12.

Next, the user removes the remaining hoses 120, 140 and 160 from within compartment 60, and also removes the impact wrench 110, the scissors tire jack 130 and the air injection nozzle 150 from their respective compartments 54, 56 and 58 of tool holding member 48, respectively, as depicted in FIGS. 2 and 3 of the drawings. The user now proceeds to connect the impact wrench hosing 120 to the quick connect air connector opening (port) 84a and to the quick connect inlet receptacle 118 on the handle member 117 of impact wrench 110. The user then proceeds to connect the tire jack hosing 140 to the quick connect air connector opening (port) 84b and to the quick connect inlet receptacle 134 on base member 152 off tire jack 130, as shown in FIGS. 3 to 5 of the drawings. The user can also attach the air injection nozzle hosing 160 to the quick connect inlet receptacle 156 of the air injection nozzle 150. The essential tools 110, 130 and 150 are now ready for use in changing flat tire 12 on wheel rim 14.

As shown in FIG. 5, the impact wrench 110 is used to remove the plurality of tire lugs/nuts 20 from the wheel rim 14 of flat tire 12. The user then places the scissors tire jack 130 at an appropriate location to raise the vehicle 16 from off of the ground 29 in order to remove the flat tire 12 and wheel rim 14 from vehicle 16. The replacement tire 22 and wheel rim 24 are then placed on the wheel axle (not shown) and the tire lugs 20 are reattached to wheel rim 24 using impact wrench 110. The tire jack 130 is then lowered via release valve 135 (to an opened configuration) and the replacement tire 22 is now in contact with the ground.

If the replacement tire 22 needs air inflation or air deflation, the user proceeds to connect the air injection nozzle hosing 160 to the quick connect air connect inlet port 84b, such that the air injection nozzle 150 is then used to further inflate or deflate the replacement tire 22 via the tire stem 22s with compressed air 18.

The tire changing tools of kit 10 are then dismantled, such that all of the component hoses 120,140,160 and 106,as well as the component tools 110,130 150 and 170 are again placed within their corresponding depressions 52, 54, 56, 58, 60 and 190 of each of the case sections 32 and 42 of carrying case 30, as shown in FIG. 2.

ADVANTAGES OF THE PRESENT INVENTION

Accordingly, an advantage of the present invention is that it provides for a tire changing kit having all portable components that include an air compressor assembly having an air compressor motor and a compressed air holding tank, an impact wrench and a tire jack, all contained within a heavy duty and compact carrying case for storage in the trunk of a vehicle.

Another advantage of the present invention is that it provides for a tire changing kit having an air compressor assembly that is lightweight, with an air inflation capacity of at least 1.0 cubic foot per minute having a power rating of at least ¼ HP at a pressure rating between 100 psig to 250 psig, wherein the air compressor motor can be powered via a cigarette lighter inlet plug of a vehicle.

Another advantage of the present invention is that it provides for a tire changing kit having a lightweight, durable, pneumatic impact wrench for removing the tire lugs or nuts from the wheel rim of the flat tire and for re-tightening the tire lugs after the flat tire has been changed by a replacement tire.

Another advantage of the present invention is that it provides for a tire changing kit having a lightweight, metal, durable, pneumatic carjack for lifting and lowering of a vehicle in order to remove and replace the flat tire of the vehicle.

Another advantage of the present invention is to provide a tire changing kit that includes a heavy duty, durable and lightweight carrying case for holding therein all of the component tools.

Another advantage of the present invention is that it provides for a tire changing kit that has the air compressor assembly built into one of the halves of the carrying case.

Another advantage of the present invention is that it provides for a tire changing kit that also includes an air injection nozzle and hose for injecting air into a flat tire or a tire needing air which may be connected to the air compressor motor.

Another advantage of the present invention is that it provides for a tire changing kit that includes a carrying case having a pressure gauge, a power transformer and a cigarette lighter inlet plug for powering the air compressor motor via the cigarette lighter of the vehicle being detachably connected to the case sections of the carrying case.

Another advantage of the present invention is that it provides for a tire changing kit that facilitates the changing of a flat tire with ease, speed and safety for use especially by women and the elderly (having no manually operated components).

Another advantage of the present invention is that it provides for a tire changing kit that is self-contained, lightweight and compact to be easily carried by hand, and which is compact for storage within a trunk area of an automobile and the like.

A further advantage of the present invention is that it provides for a tire changing kit that can be mass produced in an automated and economical manner and is readily affordable by the consumer.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A kit for changing a tire, comprising:
   a) a portable carrying case having a first compartment and a second compartment which are movable between an open position and a closed position;
   b) said first compartment for housing an air compressor motor and a tank for holding compressed air;
   c) said second compartment having a plurality of preformed depressions containing an impact wrench, a tire jack and a plurality of hoses;
   d) said tank including a plurality of air connector ports for attaching said hoses to said air connector ports and to said impact wrench and to said tire jack; and
   e) means for supplying electrical power to said air compressor motor for generating compressed air in order to pneumatically power said impact wrench and said tire jack.

2. A tire changing kit in accordance with claim 1, further including an air injection nozzle device for connecting to one of said hoses, and said air injection nozzle device for inflating or deflating a tire.

3. A tire changing kit in accordance with claim 2, wherein one of said plurality of preformed depressions contains said air injection nozzle device therein.

4. A tire changing kit in accordance with claim 1, wherein said plurality of preformed depressions are formed within a pre-fitted tool holding member, said tool holding member being disposed within said second compartment of said carrying case.

5. A tire changing kit in accordance with claim 1, wherein said air compressor motor includes an on/off power switch for electrically activating said air compressor motor.

6. A tire changing kit in accordance with claim 1, wherein said air compressor motor includes a quick connect electrical outlet for electrically connecting said means for supplying electrical power to said air compressor motor.

7. A tire changing kit in accordance with claim 1, wherein said means for supplying electrical power to said compressor motor includes an electrical cord having an electrical quick connect plug at one end and a cigarette lighter inlet plug at the other end, said cigarette lighter inlet plug for being received within and powered by a cigarette lighter receptacle of a vehicle.

8. A tire changing kit in accordance with claim 7, wherein said electrical quick connect plug is electrically connected to and received within said quick connect electrical outlet on said air compressor motor in order to power said air compressor motor.

9. A tire changing kit in accordance with claim 7, wherein one of said plurality of preformed depressions contain said electrical cord and said plugs therein.

10. A tire changing kit in accordance with claim 1, wherein said means for supplying electrical power to said air compressor motor is a standard electrical plug for use with an AC power supply for powering said air compressor motor.

11. A tire changing kit in accordance with claim 10, further including a power transformer electrically connected to said air compressor motor for use with an AC power supply for powering of said air compressor motor.

12. A tire changing kit in accordance with claim 11, further including a power switch for activating said power transformer for using an AC power supply.

13. A tire changing kit in accordance with claim 1, further including a pressure gauge connected to said tank, said pressure gauge having a pressure control knob thereon.

14. A tire changing kit in accordance with claim 13, wherein one of said plurality of preformed depressions contains said pressure gauge therein.

15. A tire changing kit in accordance with claim 1, wherein each of said hoses has a first end and a second end, and wherein each of said first and second ends includes a quick release connector member thereon.

16. A tire changing kit in accordance with claim 15, wherein said impact wrench includes a handle member having a quick connect inlet member thereon for detachably connecting thereto one of said quick release connector members of one of said hoses, one of said other quick release connector members of one of said hoses for detachably connecting to one of said air connector ports of said tank for supplying compressed air to said impact wrench.

17. A tire changing kit in accordance with claim 15, wherein said tire jack includes a base member having a quick connect inlet member thereon for detachably connecting thereto one of said quick release connector members of one of said hoses, one of said other quick release connector members of one of said hoses for detachably connecting to one of said air connector ports of said tank for supplying compressed air to said tire jack.

18. A tire changing kit in accordance with claim 15, wherein said air injection nozzle device includes an end section having a quick connect inlet member thereon for detachably connecting thereto one of said quick release connector members of one of said hoses; one of said other quick release connector members of one of said hoses for detachably connecting to one of said air connector ports of said tank for supplying compressed air to said air injection nozzle for inflating or deflating a tire.

19. A tire changing kit in accordance with claim 1, wherein said tire jack is a scissors tire jack.

20. A tire changing kit in accordance with claim 1, wherein said tire jack is a pneumatically or hydraulically operated tire jack.

21. A tire changing kit in accordance with claim 1, further including a detachable light source for illuminating the surrounding area of the vehicle's tire in the changing of the tire.

22. A tire changing kit in accordance with claim 21, wherein said detachable light source includes an extended electrical cord and a plug adaptor for electrically connecting to said air compressor motor for generating power to said light source.

23. A tire changing kit in accordance with claim 21, wherein said light source is a light bulb, a fluorescent light bulb or a high intensity light bulb.

24. A tire changing kit in accordance with claim 23, wherein said light source includes a light on/off switch for activating the illumination of said light bulbs.

* * * * *